(12) United States Patent
Lee

(10) Patent No.: US 6,302,826 B1
(45) Date of Patent: Oct. 16, 2001

(54) DIRECT DRIVING APPARATUS FOR AN ELECTRIC TREADMILL

(76) Inventor: Ying-Che Lee, 1st Fl, 6-1, Lane 61, Yung Kang Street, Taipei City (TW)

( * ) Notice: Subject to any disclaimer, the term of this patent is extended or adjusted under 35 U.S.C. 154(b) by 0 days.

(21) Appl. No.: 09/531,512

(22) Filed: Mar. 21, 2000

(51) Int. Cl.[7] .................................................. A63B 22/00
(52) U.S. Cl. ............................................. 482/54; 482/51
(58) Field of Search ........................................ 482/51, 54

(56) References Cited

U.S. PATENT DOCUMENTS 6,042,514 * 3/2000 Abelbeck ................................ 482/54

* cited by examiner

*Primary Examiner*—Glenn E. Richman
(74) *Attorney, Agent, or Firm*—Rosenberg, Klein & Lee

(57) ABSTRACT

The present invention relates to a direct driving apparatus for an electric treadmill which includes a fixing axle disposed at front end of a frame of a treadmill; a roller driving a running belt and being constructed hollow inside thereof, two ends of the roller being fitted with an U-shaped turning wheel with an outward opening respectively, a plurality of permanent magnet sets being disposed at the inner rim of the turning wheel; a stator core having a coil thereon, the coil being fastened on a fixing socket with a receiving hole and being coupled with the permanent magnet to form a brushless motor; and a current control used for controlling the speed of the turning wheel and the roller. When the current control supplies electricity to the coil, it is a direct driving motorized device while it is a non-motorized treadmill at power failure.

4 Claims, 6 Drawing Sheets

DIRECT DRIVING APPARATUS FOR AN ELECTRIC TREADMILL

BACKGROUND OF THE INVENTION

1. Field of the Invention

The present invention relates to a direct driving apparatus for an electric treadmill, and more particularly, to a apparatus which applies the brushless motor to enable a turning wheel to directly drive the roller of the running belt.

2. Description of the Prior Art

The treadmill is widely regarded as a practical indoor exercise apparatus with the best exercise effect. The electric treadmill has the speed-adjusting merit in accordance with different using requirements. The primary driving apparatus of a conventional electric treadmill, as shown in FIG. 1 and 2, includes a motor 12 with a reduction gear box. A belt transmission wheel or a toothed wheel 14 at the side of the roller 15 is driven by means of a belt or a drive chain 13 so that the roller 15 brings the running belt 16 in motion. The greatest disadvantage of the above-mentioned device is that the transmission of the belt or the chain 13 causes noise and vibration. Moreover, the power output axle 12 of the motor 12 rotates rapidly and its torsion is small so that the roller 15 can't be directly driven by the output axle. It's required that the speed of the output axle has to be reduced by means of the reduction gear and the gear 14 to increase the torsion for driving the roller 15 in motion. However, it can't be used as non-motorized treadmill at power failure or without power supply because the running belt 16 can't bring the roller 15 in motion. Additionally, the transmission members like belt or chain cause abrasion problem so that its life is shortened.

SUMMARY OF THE INVENTION

It is a primary object of the present invention to provide a direct driving apparatus for an electric treadmill which doesn't require a transmission belt, a belt transmission wheel or a drive chain, a toothed wheel so that low noise and vibration can be achieved.

It is another object of the present invention to provide a direct driving apparatus for an electric treadmill with low abrasion, high inertia force and long using life.

It is a further object of the present invention to provide a direct driving apparatus for an electric treadmill which can be as a motorized device when with power supply or a non-motorized device when without power supply or at power failure.

BRIEF DESCRIPTION OF THE DRAWINGS

The drawings disclose illustrative embodiments of the present invention which serve to exemplify the various advantages and objects hereof, and are as follows.

DETAILED DESCRIPTION OF THE PREFERRED EMBODIMENT

Figure 1:
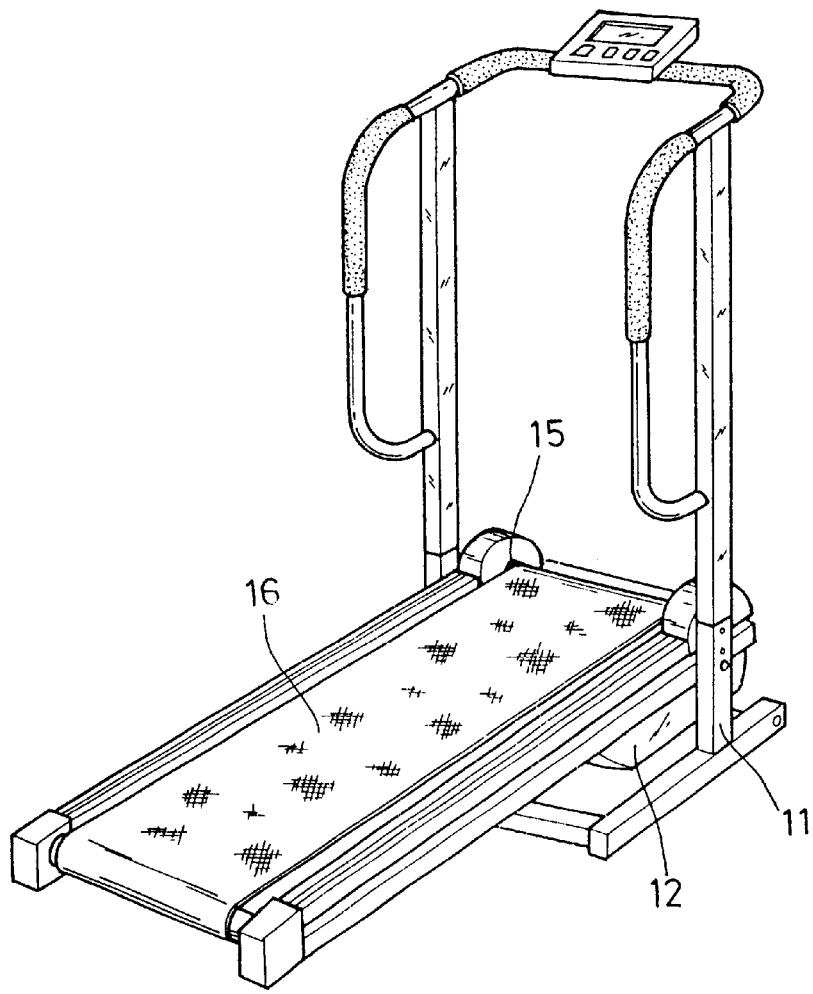
FIG. 1 is a perspective view of a conventional treadmill.
Figure 2:
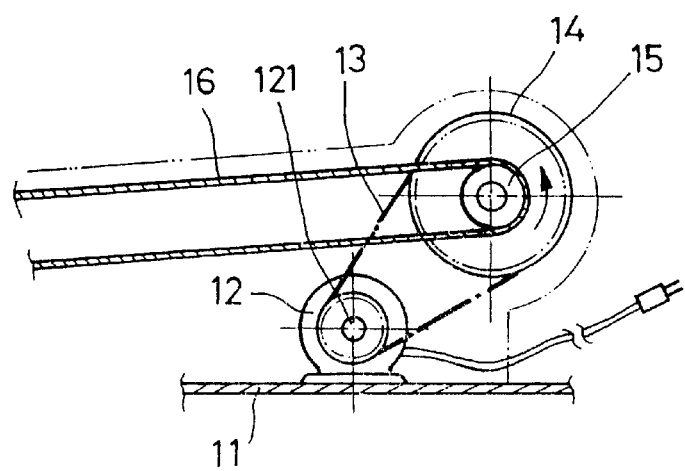
FIG. 2 is a schematic drawing of the driving apparatus of FIG. 1.
Figure 3:
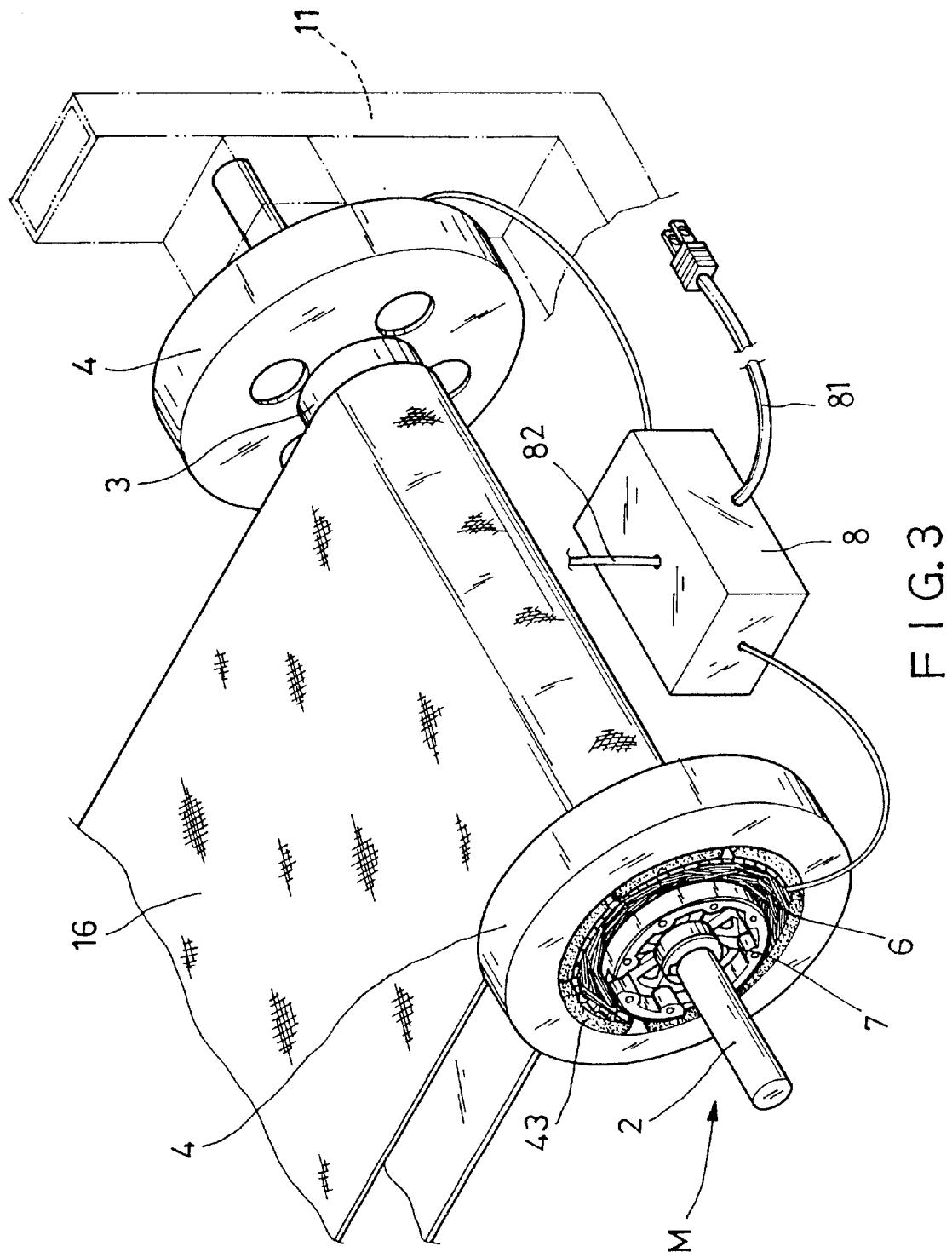
FIG. 3 is a perspective exploded view of the driving apparatus of the present invention.
Figure 4:
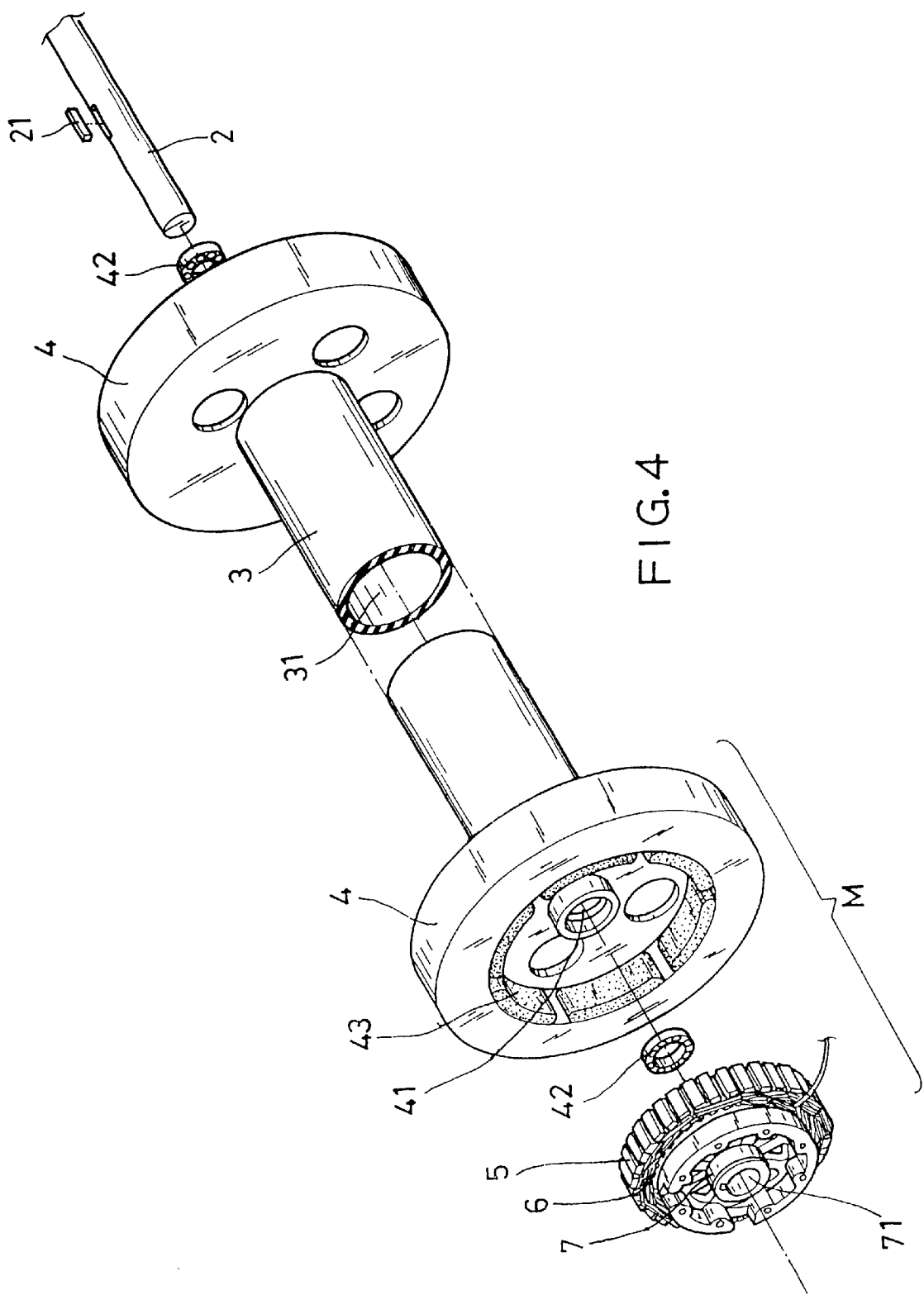
FIG. 4 is a perspective view of the driving apparatus of the present invention.

First of all, referring to FIG. 3 through 6, the direct driving apparatus for an electric treadmill in accordance with the present invention includes:

a fixing axle 2 disposed at front end of a frame 11 of the treadmill;

a roller 3 driving a running belt 16 and being constructed with a hollow body 31 inside thereof, two ends of the roller 3 being fitted with an U-shaped turning wheel 4 with an outward opening respectively, a bearing 42 being mounted in an axle hole 41 of the turning wheel 4 so that the roller 3 and the turning wheel 4 being coupled together, a plurality of permanent magnet 43 sets being disposed at the inner rim of the turning wheel 4;

a stator core 5 having a coil 6 thereon, the coil 6 being fastened on a fixing socket 7 with a receiving hole 71, the fixing socket 7 being located on the fixing axle 2 by means of a key 21 or any equivalence in order to enable the stator core 5 and the coil 6 at the outer rim thereof to be positioned at the inner rim of the turning wheel 4 to be coupled with the permanent magnet 43 to form a brushless motor (M); and a current control 8 having a plug 81 to make connection with AC power, a signal cable 82 being connected to a control panel (not shown) disposed on the top of the treadmill frame 11 for controlling the current amount of the coil 6 so that the speed of the turning wheel 4 and the roller 3 being controlled.

Accordingly, when the plug 81 is connected to AC power in order for the current control 8 to supply a certain current amount to the coil 6 to bring the coupled turning wheel 4 on the external periphery in rotation to form a brushless generator motor (M). Furthermore, the turning wheel 4 and the roller 3 are coupled in simultaneous motion so that when the turning wheel 4 operated as the rotor of brushless motor (M) is turned by means of the electromagnetic force of the coil 6, the running belt 16 coiled around the roller 3 is directly driven without the transmission belt or drive chain. Thus, the goal of low noise and low vibration can be achieved. In addition, the turning wheel 4 is driven by means of the electromagnetic force of the coil 6 so that the abrasion won't be created and the using life can be prolonged.

Figure 5:
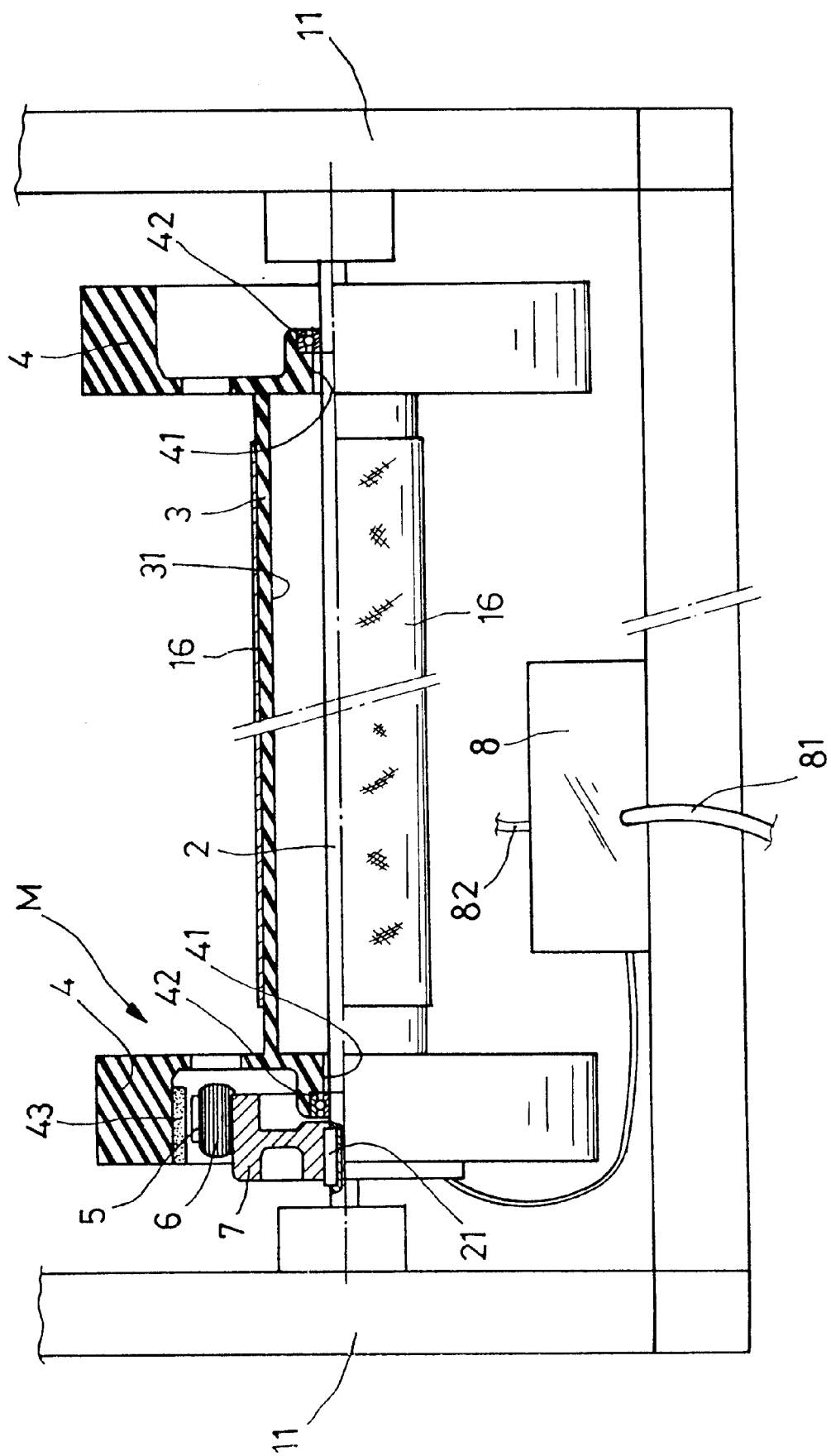
FIG. 5 is a schematic drawing of an applicable embodiment of the present invention.
Figure 6:
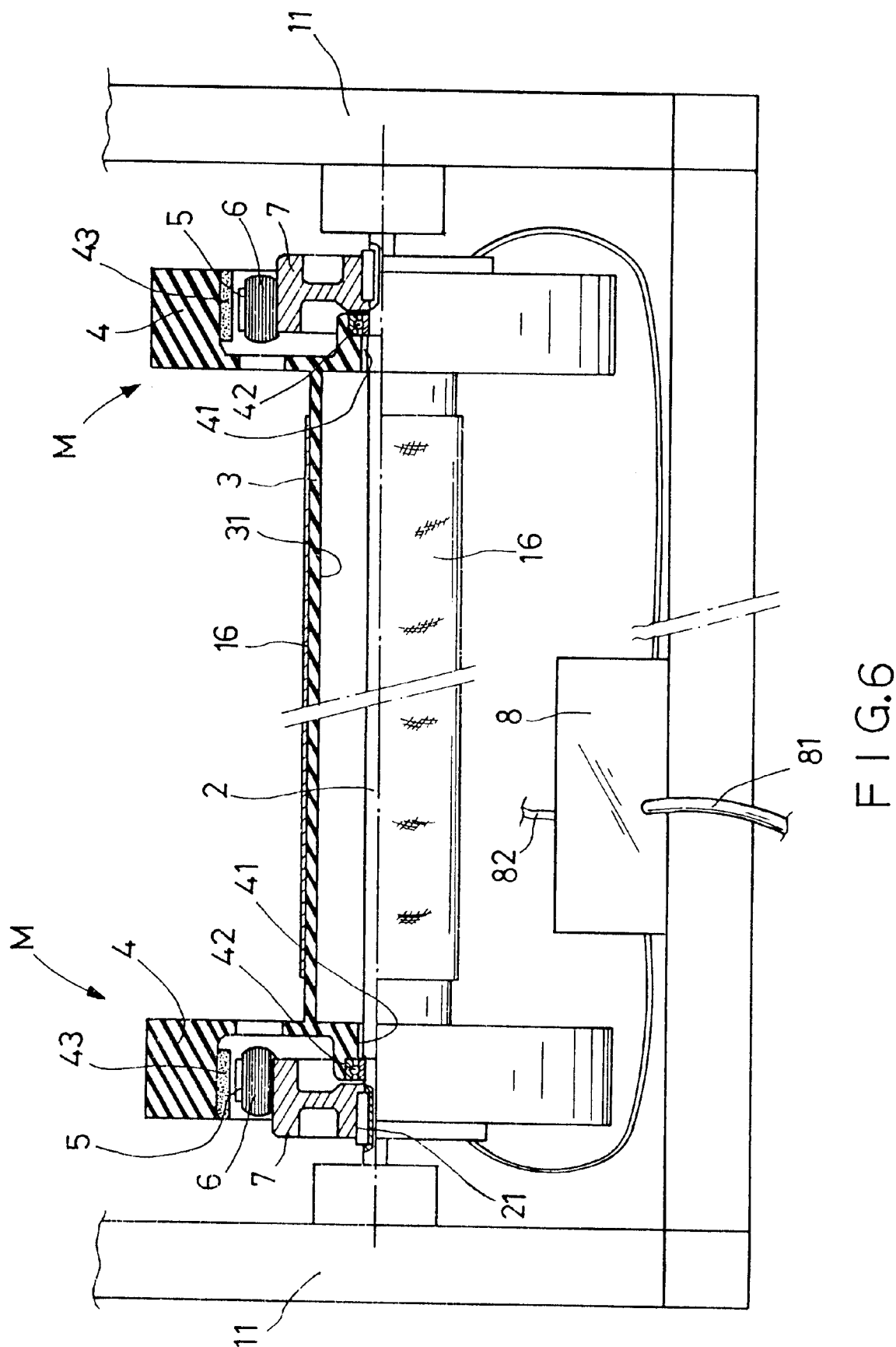
FIG. 6 is a schematic drawing of another applicable embodiment of the present invention.

FIG. 5 shows a schematic drawing of an applicable embodiment of the present invention. The turning wheel 4 includes a stator that consists of a core 5, a coil 6 and a fixing socket 7 which are disposed at inner rim of the turning wheel 4. The electromagnetic force created by the coil 6 is used to drive the turning wheel 4 coupled therewith. In order to increase its torsion, as shown in FIG. 6, the inner rim of two turning wheels 4 can be fitted with a permanent magnet 43, a core 5, a coil 6 and a fixing socket 7. The current can be simultaneously supplied in parallel by the current control 8 so that the two turning wheels 4 can be simultaneously driven.

Figure 7:
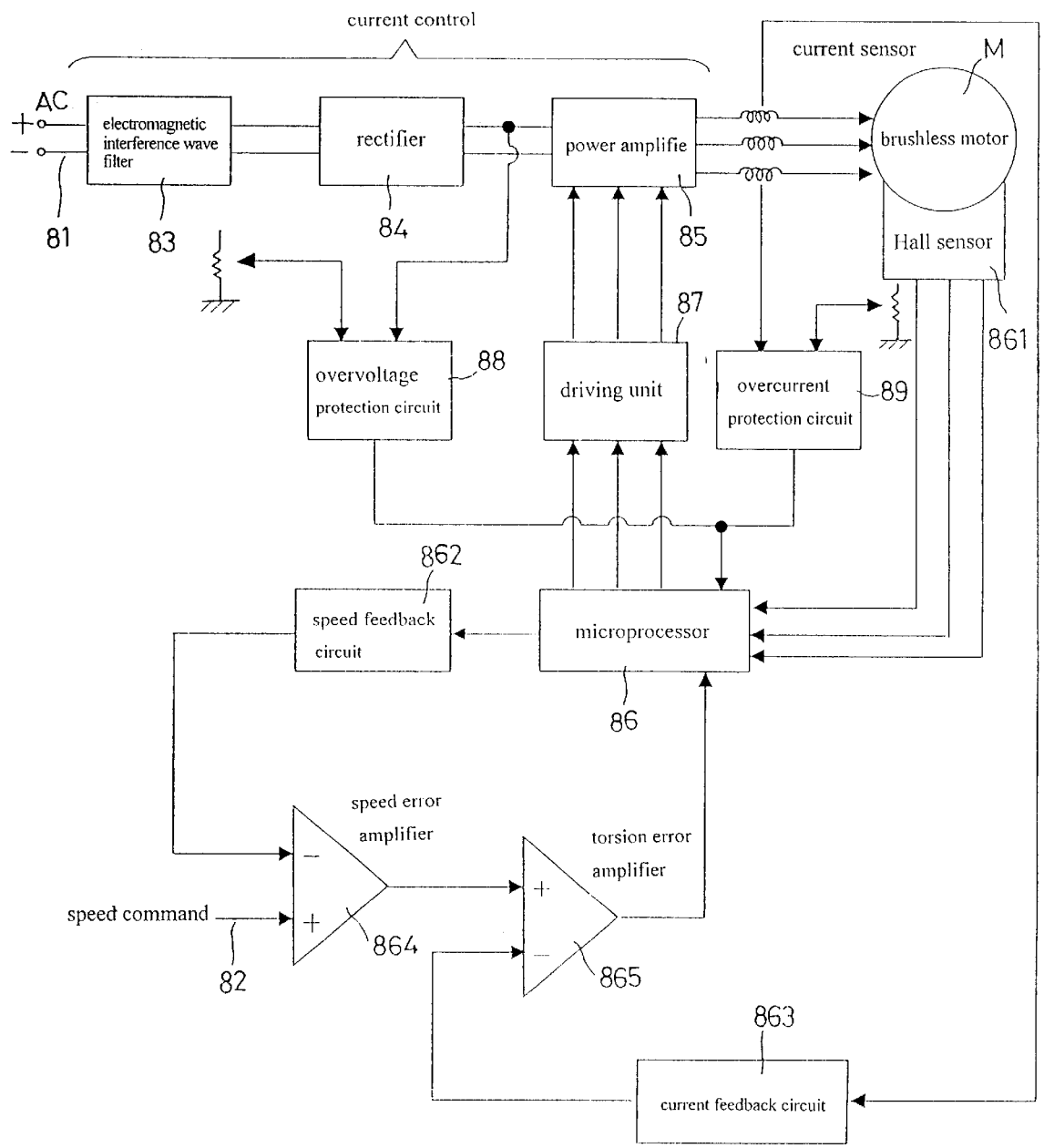
FIG. 7 is a circuit block diagram of a current control of the present invention.

FIG. 7 shows a circuit block diagram of a current control of the present invention. The AC current inputted through the plug 81 will then be sent to the rectifier 84 for rectifying the current after it is filtered by an electromagnetic interference wave filter 83, and reaches the brushless motor (M) after passing through a power amplifier 85. The position (angle) signal is transmitted to a microprocessor 86 by means of a Hall sensor 861 disposed at the side of the brushless motor (M), and the signal is sent back to the microprocessor 86 by means of a speed feedback circuit 862 and a current feedback circuit 863 respectively through a speed error amplifier 864 and a torsion error amplifier 865 so that the driving unit 87 drives the brushless motor (M) to reach a pre-arranged rotation speed. Furthermore, a voltage protection circuit 88 is connected behind the rectifier 84 while a current protection circuit 89 is connected behind the power amplifier 85 in order to protect the whole circuit and the brushless motor (M).

By means of the above mentioned circuit control, the user can give motion speed commands on the control panel (not shown) which will be transmitted to the speed error amplifier 864 through the signal cable 82. After it is compared with the value of the current feedback circuit 863 at the torsion error amplifier 865, the motion speed of the brushless motor (M) can be adjusted by the microprocessor 86.

Furthermore, the present invention can be used as a conventional non-motorized treadmill at power failure. Moreover, when the user runs on the running belt 16 to bring the roller 3 in motion, the turning wheel 4 will also be rotated so that the permanent magnet 43 at inner rim thereof will be excited in cooperation with the coil 6 to produce the electricity through the electromagnetic energy. Accordingly, the brushless motor (M) can be used as generator at power failure by means that the user brings the turning wheel 4 in motion. Therefore, the brushless motor (M) can supply the power required by the control panel.

Moreover, the features of the present invention can be concluded as follows:

1. When the main power is supplied to the coil 6, a brushless motor (M) type is created to directly drive the turning wheel 4 to rotate which is used as power source. In addition, the present invention can be used as an electric treadmill, and the noise and the vibration are both very low. In comparison with the indirect transmission of the conventional treadmill, the present invention is much improved in the using comfort.

2. The turning wheel 4 at the outer rim of the brushless motor (M) can be brought into rotation by the roller 3 at the power failure so that a generator type is produced and the present invention can be used as a non-motorized treadmill.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claim.

What is claimed is:

1. A direct drive system for an electric treadmill comprising:
   (a) a frame;
   (b) a fixing axle extending between opposed portions of said frame;
   (c) a pair of turning wheels coaxially coupled in angularly displaceable manner to said fixing axle, each said turning wheel having a substantially U-shaped sectional contour defining a recess and an inner rim wall surface extending thereabout,
   (d) a plurality of permanent magnets coupled to said inner rim wall surface for each said turning wheel,
   (e) a pair of fixing sockets coupled to said fixing axle to extend respectively into said recesses of said turning wheels;
   (f) a pair of stator cores coupled respectively to said fixing sockets, each said stator core being radially spaced from said permanent magnets of one said turning wheel, each said stator core having coil windings formed thereon;
   (g) a driving roller extending axially between said turning wheels for engaging one end portion of an endless running belt; and,
   (h) a current control unit coupled to each of said stator cores, said current control unit being operable to adjustably energize said stator cores for brushless motor coupling with said permanent magnets of said turning wheels responsive to AC power and user inputs;
   whereby said driving roller is selectively rotated about said fixing axle to drive the looped displacement of the endless running belt.

2. The direct drive system as recited in claim 1 wherein said stator cores, fixing sockets, and turning wheels are respectively disposed in coaxial manner, each said stator core extending radially outward from said fixed axle to radially oppose said magnets of one said turning wheel.

3. The direct drive system as recited in claim 2 wherein each said turning wheel has formed therethrough an axle hole, each said turning wheel receiving in said axle hole a bearing engaging said fixed axle in angularly displaceable manner.

4. The direct drive system as recited in claim 3 wherein each said fixing socket has formed therethrough a receiving hole engaging said fixed axle in keyed manner.

* * * * *